United States Patent
Bruinsma et al.

(10) Patent No.: US 10,167,406 B2
(45) Date of Patent: Jan. 1, 2019

(54) WHITE PIGMENT DISPERSIONS

(71) Applicant: Hewlett-Packard Development Company, L.P., Fort Collins, CO (US)

(72) Inventors: Paul Joseph Bruinsma, San Diego, CA (US); Vladek Kasperchik, Corvallis, OR (US); Thomas W. Butler, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 23 days.

(21) Appl. No.: 15/544,578

(22) PCT Filed: May 29, 2015

(86) PCT No.: PCT/US2015/033152
§ 371 (c)(1),
(2) Date: Jul. 19, 2017

(87) PCT Pub. No.: WO2016/175870
PCT Pub. Date: Nov. 3, 2016

(65) Prior Publication Data
US 2017/0362456 A1    Dec. 21, 2017

(51) Int. Cl.
| C09D 17/00 | (2006.01) |
| C09C 1/00 | (2006.01) |
| C09C 3/00 | (2006.01) |
| C09C 1/04 | (2006.01) |
| C09C 1/36 | (2006.01) |
| C09D 11/102 | (2014.01) |
| C09D 11/322 | (2014.01) |
| C09D 11/40 | (2014.01) |
| C09D 11/54 | (2014.01) |
| C09D 11/107 | (2014.01) |

(52) U.S. Cl.
CPC .............. C09D 17/001 (2013.01); C09C 1/00 (2013.01); C09C 1/043 (2013.01); C09C 1/3607 (2013.01); C09C 1/3669 (2013.01); C09C 1/3676 (2013.01); C09C 3/00 (2013.01); C09D 11/102 (2013.01); C09D 11/107 (2013.01); C09D 11/322 (2013.01); C09D 11/40 (2013.01); C09D 11/54 (2013.01); C09D 17/008 (2013.01); C01P 2004/62 (2013.01); C01P 2006/22 (2013.01)

(58) Field of Classification Search
CPC ..... C09D 11/322; C09D 11/54; C09C 1/3669; C09C 1/3676
USPC ......................................... 523/160; 524/497
See application file for complete search history.

(56) References Cited

U.S. PATENT DOCUMENTS

| 5,972,087 | A | 10/1999 | Uraki et al. |
| 7,026,368 | B2 | 4/2006 | Yamada et al. |
| 7,622,513 | B2 | 11/2009 | Sarkisian et al. |
| 7,635,504 | B2 | 12/2009 | Elwakil et al. |
| 7,850,774 | B2 | 12/2010 | Oriakhi |
| 8,198,391 | B2 | 6/2012 | Itoya et al. |
| 8,318,120 | B2 | 11/2012 | Nelson et al. |
| 8,404,761 | B2 | 3/2013 | Shinozaki et al. |
| 8,449,097 | B2 | 5/2013 | Nishimura et al. |
| 8,466,213 | B2 | 6/2013 | Ueno et al. |
| 8,512,827 | B2 | 8/2013 | Seguchi et al. |
| 8,617,302 | B2 | 12/2013 | Okuda et al. |
| 8,771,556 | B2 | 7/2014 | Kim et al. |
| 8,783,842 | B2 | 7/2014 | Ingle et al. |
| 8,784,508 | B2 | 7/2014 | Ellis |
| 8,784,550 | B2 | 7/2014 | Kasperchik et al. |
| 2004/0063808 | A1 | 4/2004 | Ma et al. |
| 2005/0231573 | A1 | 10/2005 | Bruinsma et al. |
| 2006/0155005 | A1 | 7/2006 | Kondo et al. |
| 2010/0047456 | A1 | 2/2010 | Kariya |
| 2010/0190922 | A1 | 7/2010 | Shinozaki et al. |
| 2010/0222492 | A1 | 9/2010 | Sarkisian et al. |
| 2010/0231671 | A1 | 9/2010 | Anton et al. |
| 2013/0092049 | A1 | 4/2013 | Lee et al. |
| 2013/0155160 | A1 | 6/2013 | Shiono |
| 2013/0202858 | A1 | 8/2013 | Shimohara |
| 2013/0224451 | A1 | 8/2013 | Shiono et al. |
| 2014/0118449 | A1 | 5/2014 | Sarkisian et al. |
| 2014/0123874 | A1 | 5/2014 | Kabalnov et al. |
| 2014/0170395 | A1 | 6/2014 | Kasperchik et al. |
| 2014/0288208 | A1* | 9/2014 | Sasada ................. C09D 11/107 523/200 |

(Continued)

FOREIGN PATENT DOCUMENTS

| EP | 1258510 | 11/2002 |
| EP | 1388578 | 2/2004 |
| EP | 2206753 | 7/2010 |

(Continued)

OTHER PUBLICATIONS

International Search Report and Written Opinion dated Sep. 25, 2015 for PCT/US2015/033152; Applicant Hewlett-Packard Development Company L.P.

*Primary Examiner* — Fred M Teskin

(74) *Attorney, Agent, or Firm* — Thorpe North & Western LLP

(57) ABSTRACT

The present disclosure provides white pigment dispersions, which can include an aqueous liquid vehicle, and from 5 wt % to 70 wt % of a white metal oxide pigment dispersed by two co-dispersants. The metal oxide pigment can have an average particulate size from 100 nm to 1 μm, and the co-dispersants can include both i) a short-chain anionic dispersant having a weight average molecular weight ranging from 1,000 Mw to 30,000 Mw, and ii) a non-ionic or predominantly non-ionic dispersant.

15 Claims, 3 Drawing Sheets

(56) References Cited

U.S. PATENT DOCUMENTS

2014/0352573 A1  12/2014  Kasperchik et al.
2014/0354740 A1  12/2014  Smet et al.

FOREIGN PATENT DOCUMENTS

| EP | 2599841 | 6/2013 |
|---|---|---|
| JP | 2002038063 | 2/2002 |
| JP | 2014214221 | 11/2014 |
| WO | 2006049012 | 5/2006 |
| WO | 2007035505 | 3/2007 |
| WO | 2009053302 | 4/2009 |
| WO | 2012009415 | 1/2012 |
| WO | 2012054052 | 4/2012 |
| WO | 2012170032 | 12/2012 |
| WO | 2013162513 | 10/2013 |
| WO | 2014042652 | 3/2014 |
| WO | 2014066608 | 5/2014 |
| WO | 2014135843 | 9/2014 |
| WO | 2014193387 | 12/2014 |

\* cited by examiner

WHITE PIGMENT DISPERSIONS

BACKGROUND

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at lower costs than comparable products available just a few years ago. Notwithstanding their recent success, research and development efforts continue toward improving ink-jet print quality over a wide variety of different applications, but there remain challenges. In one instance, certain pigments can be more challenging than other in achieving certain desirable properties. For example, with certain pigments that often utilize a higher pigment load, e.g., white, there can be problems of jetting reliability and print quality, particularly with thermal inkjet imaging applications on non-porous substrates. More specifically, decap and kogation problems can arise when jetting high pigment load inks, and furthermore, the application of thick ink layers that may otherwise be desirable for improving print opacity can lead to undesirable media surface coalescence and print quality degradation.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1:
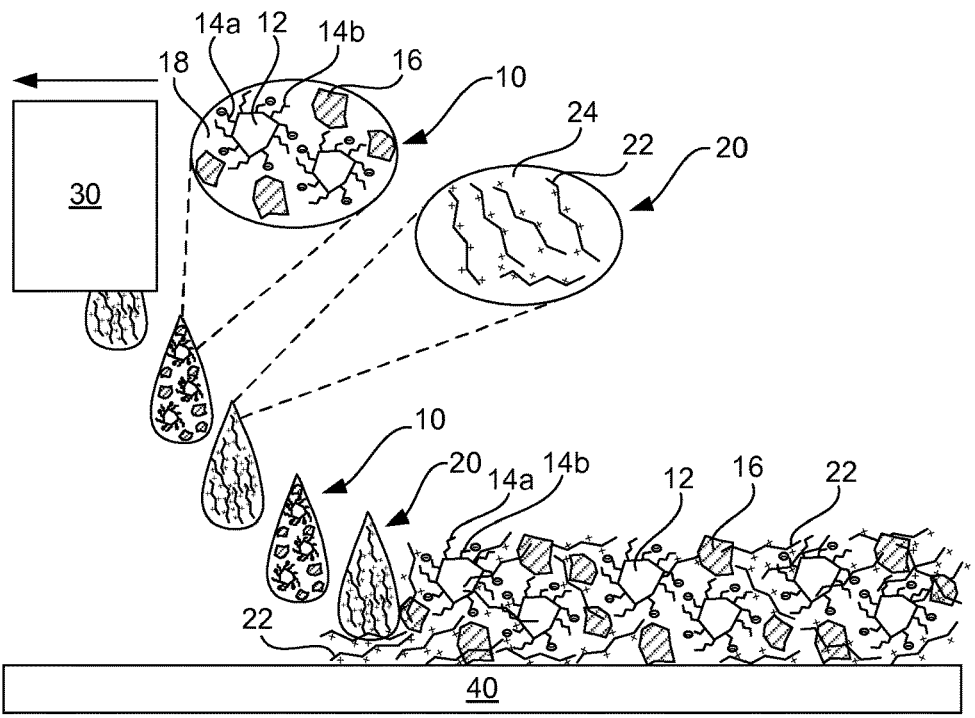
FIG. 1 depicts examples where a cationic polymer formulation is digitally printed on a media substrate contemporaneously or just before printing a white inkjet ink thereon, and wherein the white inkjet ink is prepared in accordance with examples of the present disclosure.

Reference will now be made to the exemplary embodiments illustrated, and specific language will be used herein to describe the same. It will nevertheless be understood that no limitation of the scope of the disclosure is thereby intended.

DETAILED DESCRIPTION

The present disclosure is drawn to white pigment dispersions, which can be formulated into white inks and water-based white inkjet inks that can be jetted from various types of inkjet printheads, but which can also be particularly friendly for use in thermal inkjet printheads. These inks, in some instances with the assistance of a fixer coating layer or fixer ink, can be printed not only on porous media, but also effectively on more challenging non-porous polymer media.

With the white pigment dispersions and the related white inks, there can be advantages to using relatively large white metal oxide pigment particles (e.g., 100 nm to 2 μm) at a high pigment load (e.g., 5 wt % to 50 wt %, or 10 wt % to 30 wt %) for ink layers that are relatively thick (e.g., up to 80 gsm). One advantage includes providing high hiding power when printing with white inks on colored substrates, e.g., ink thickness, high pigment load, and/or light scattering of pigment particles enhances ink hiding power on darker substrates. That being described, having such a high pigment load in inkjet ink formulations very often interferes with reliable jetting, particularly with small drop weight thermal inkjet printheads. Typical failures include formation of solid pigment plugs inside or on top of printhead nozzles caused by ink drying (also know as decap or crusting), which leads to print start-up issues, e.g. there is often striping that may occur at startup. Additionally, there can be an accumulation of thick pigment residue on surface of the small heaters that are present in the firing chamber of inkjet printhead, which can lead to severe drop velocity decay over time (also known as kogation).

Thus, in accordance with examples of the present disclosure, white pigment dispersions can include an aqueous liquid vehicle, and from 5 wt % to 70 wt % of a white metal oxide pigment dispersed by two co-dispersants. The metal oxide pigment can have an average particulate size from 100 nm to 1 μm, and the co-dispersants can include both i) a short-chain anionic dispersant having a weight average molecular weight ranging from 1,000 Mw to 30,000 Mw, and ii) a non-ionic or predominantly non-ionic dispersant. In one example, the white pigment dispersion can be formulated as an inkjet ink with from 5 wt % to 50 wt % white metal oxide pigment, and from 2 wt % to 30 wt % latex particulates having a glass transition temperature from −20° C. to 130° C.

In another example, a method of making a white metal oxide pigment dispersion can include milling a slurry with from 5 wt % to 70 wt % of a white metal oxide pigment in an aqueous liquid vehicle with co-dispersants. The co-dispersants can include both i) short-chain anionic dispersant having a weight average molecular weight ranging from 1,000 Mw to 30,000 Mw, and ii) non-ionic or predominantly non-ionic dispersant. Again, the method can also include formulating the white pigment dispersion into a white inkjet ink including steps of admixing water, organic co-solvent, and latex particulates with white metal oxide pigment dispersion.

In another example, a fluid set for inkjet imaging can include a white ink and a fixer fluid. The white ink can include an aqueous ink vehicle, from 5 wt % to 50 wt % of a white metal oxide pigment having an average particulate size from 100 nm to 1,000 nm, and 2 wt % to 30 wt % latex particulates. The white metal oxide pigment can be milled and dispersed with co-dispersants including both i) short-chain anionic dispersant having a weight average molecular weight ranging from 1,000 Mw to 30,000 Mw, and ii) non-ionic or predominantly non-ionic dispersant. The fixer fluid can include an aqueous fixer vehicle, and from 0.1 wt % to 25 wt % cationic polymer. The fixer fluid can be formulated for inkjet application having a viscosity from 1 cP to 35 cP at 25° C., or can be formulated for analog application having a viscosity from 1 cP to 500 cP at 25° C.

These white pigment dispersions and white inks can be used in forming white images on various media substrate, including smooth polymer (non-porous) media substrate, and can be printed in combination, as mentioned, with a fixer coated on the surface of the media. For example, a fixer with cationic polymer can be applied to the media substrate and can be formulated so that its cationic polymer interacts with any anionically charged components in the white ink to immobilize the white metal oxide pigment. In this example, the anionically charged component includes the short-chained anionic dispersant that is absorbed or adsorbed on the surface of the milled white metal oxide pigment surface.

Figure 2:
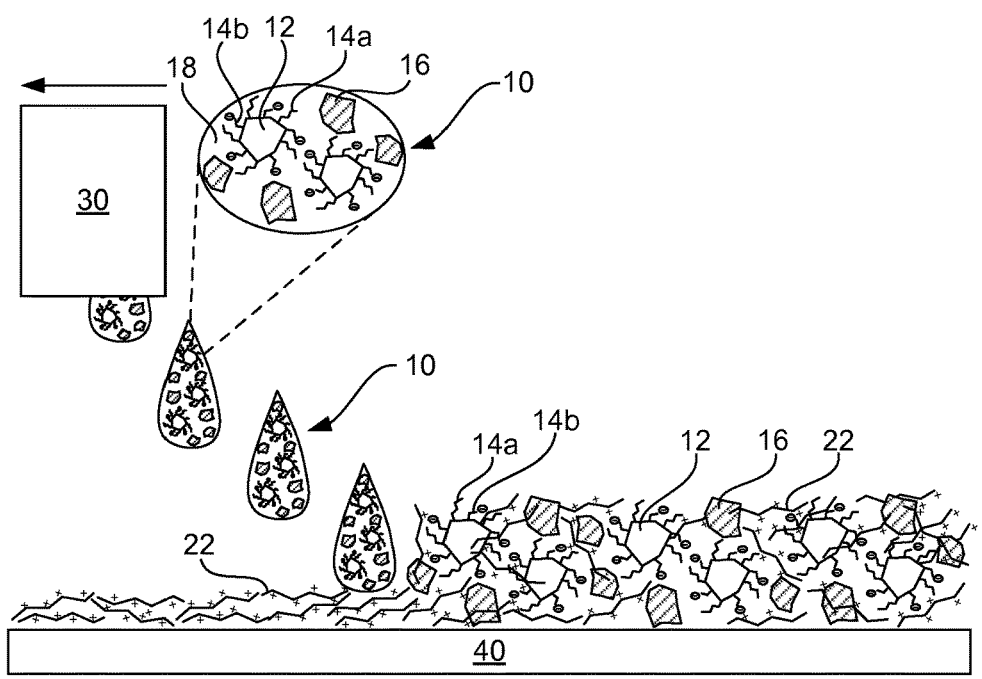
FIG. 2 depicts examples where a cationic polymer is applied to a media substrate prior to (either digital or by analog application) printing a white inkjet ink thereon, and wherein the white inkjet ink is prepared in accordance with examples of the present disclosure.

Turning now to the FIGS, FIG. 1 depicts an example where a digitally printed fixer is applied just prior to or essentially simultaneously with an inkjet ink of the present disclosure. FIG. 2 depicts an example where a fixer is applied to a media substrate prior to application of an inkjet ink. The fixer in this latter example can likewise be applied by digital printing, or alternatively, by analog application, e.g., roller, curtain coating, blade coating, Meyer rod coating, or any other coating methodology suitable for producing thin layer of fixer on the printed substrate, etc.

As shown in FIGS. 1 and 2, an inkjet printing device 30 is adapted to digitally print a white inkjet ink 10, and in some examples, a fixer composition 20 on a media substrate 40. The media substrate can be a smooth, non-porous polymer substrate that is otherwise difficult to print on with high image quality and high durability. Specifically, FIG. 1 shows the fixer composition being printed digitally from the printing device, and FIG. 2 shows the fixer composition being pre-applied to the media substrate, either digitally or by an analog coating method. In both examples, the white inkjet ink includes white metal oxide pigment 12 particles that are co-dispersed with both short-chain anionic dispersant 14a, and non-ionic or predominantly non-ionic dispersant 14b. The white ink can further include latex particulates 16, and a liquid vehicle 18 which typically includes water, organic solvent, and/or other ingredients can be conventionally present. It is noted that what is shown at 10 is an exemplary white ink, which is one specific type of white pigment dispersion. The white pigment dispersion, at its elemental level, might only include the white metal oxide pigment, the co-dispersants (two types) associated with the pigment surface, and the liquid vehicle. In further detail, the fixer composition can include cationic polymer 22 that is interactive with the surface of the white pigment, e.g., short-chain anionic dispersant, or other anionic components that may be found in the white ink, thereby providing some immobilization or freezing of the pigment and particles on the print media substrate.

Figure 3:
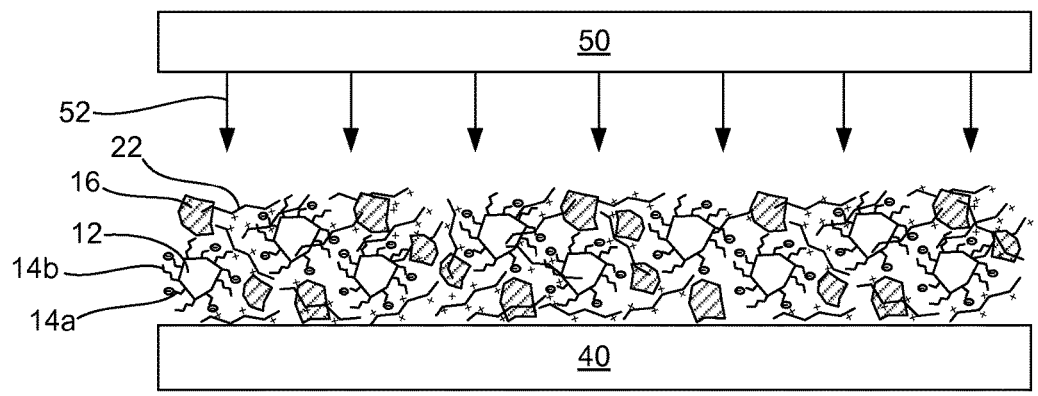
FIG. 3 depicts examples of heat drying and fusing an image printed in as described in FIG. 1 or 2 in accordance with examples of the present disclosure.
Figure 4:
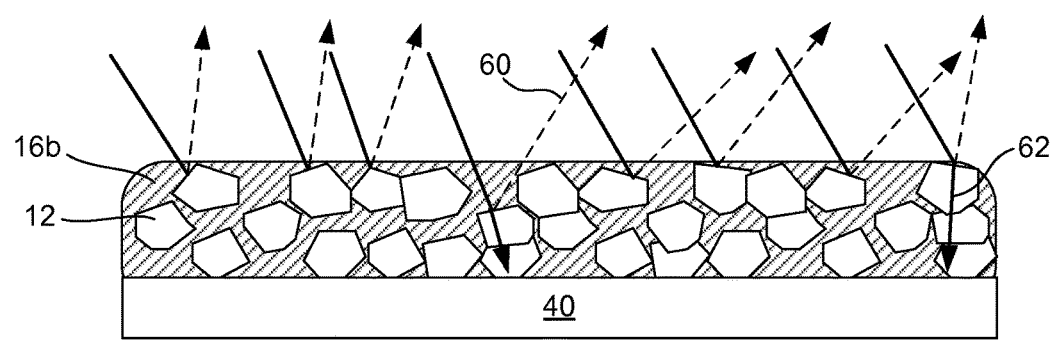
FIG. 4 depicts a printed article, such as that shown in FIG. 3, after heat fusing on the media substrate in accordance with examples of the present disclosure.

In another example, the image printed or otherwise generated in accordance with FIGS. 1 and 2 can be heat fused. More specifically, FIG. 3 shows a heat fusing device 50 which is used to apply heat 52 to the printed article to form a heat fused printed article as shown in FIG. 4. As shown in FIG. 3, the printed image prior to heat fusing can include the white metal oxide pigment 12 which is dispersed by the co-dispersants 14a,14b, and the latex particulates 16 provide spacing between white metal oxide pigment particles. Once heat fused, the latex and co-dispersants can become fused together as a single polymeric mass 16b, as shown in FIG. 4, and there can be enhanced light scattering 60 and lower transmittance 62 than even more densely packed white metal oxide pigment, which thus provides enhanced opacity. Alternatively, regarding melting/fusing of individual latex particles, polymeric chains within neighboring latex particles as well as dispersant polymer chains may intermix during curing and link them into continuous low refractive index phase. A cohesive film can thus be produced during curing, but it is noted that individual latex particles typically retain some of their spherical characteristics (as viewed by SEM).

This increased opacity can be achieved by optically spacing the white metal oxide pigment particles from one another. For example, drying the inks without the latex particulates such that all of the high refractive index particulates are in close contact may lead to formation of a densely packed layer of the white metal oxide pigment, which can reduce light scattering and overall opacity. On the other hand, using the latex particulates (and/or other optical spacers), and typically applying heat to fuse the latex particulates, the low refractive index optical spacing can boost the opacity of the printed coating by from 0.1% to 25%, or more typically from 5% to 20% or from 5% to 25%. In other words, the crowding effect of tightly-packed high refractive index (n) particulates with little or no voids decreases light scattering and increase transparency of the coating. By optically spacing the white metal oxide pigment with the low refractive index latex, an increase in opacity can be realized. As a further point, fusion can add enhanced durability to the printed article. In some cases, the fusing of the latex particulates may help the latex polymer distribute more evenly between light scattering white metal oxide pigment particles and, hence, further improve opacity as well.

In accordance with this, a printed article can include up to 80 gsm, or up to 50 gsm, of a total fluids (white ink+fixer) applied to a media substrate. The term "up to 80 gsm" is used because typical inkjet images include fully imaged areas as well as non-imaged and/or lower density areas. After water and solvent(s) evaporation and fusing, the gsm roughly translates into 15-50 wt % of the initial fluid dispersion flux density, i.e. thus less than 60 gsm. In one example, full density inked area may be at from 30 to 60 gsm ink/fixer film, but densities lower in the tone ramp will be lower than this, thus the use of the phrase "up to" 80 gsm or "up to" 60 gsm. That being stated, though some areas on a media substrate might be at 0 gsm under this definition (unprinted areas), there will be areas that are imaged that range from greater than 0 gsm up to 60 gsm (after drying or heat fusing). In a typical printed article, there is a portion of the media that can be printed at from 5 gsm to 60 gsm.

Turning now to the various specific ingredients that are present in the white ink, there can be a white metal oxide pigment. The "white" pigment provides much of the white coloration to the ink, though without the other ingredients in the ink, individual pigment particles may have some transparency or translucency. Examples of white metal oxide pigments that can be used include titanium dioxide particulates, zinc oxide particulates, zirconium oxide particulates, combinations thereof, or the like. Pigments with high light scatter capabilities, such as these, can be selected to enhance light scattering and lower transmittance, thus increasing opacity. White metal oxide pigments can have a particulate size from about 100 nm to about 1,000 nm, and more typically, from about 125 nm to 700 nm, and in still another example, from about 150 nm to 500 nm. The combination of these pigments within these size ranges, appropriately spaced from one another, can be printed with high opacity at relatively thin thickness, e.g., 5 gsm to 50 gsm after removal of water and other solvent(s) from the printed ink and fixer film.

The white metal oxide pigment, among other solids that may be present, can be dispersed using a co-dispersant package of the present disclosure, e.g., the short-chain anionic dispersant and non-ionic or predominantly non-ionic dispersant. In certain examples, the short-chain anionic dispersant can be present in the white pigment dispersion at from 0.005 wt % to 2 wt %, and can have a weight average molecular weight of 1,000 Mw to 15,000 Mw. In other examples, the non-ionic or predominantly non-ionic dispersant can be present in the white pigment dispersion at from 0.01 wt % to 4 wt %, and/or can have a weight average molecular weight from 500 Mw to 50,000 Mw. As noted, the white pigment dispersion can be in the form of a dispersion used to generate other formulations, e.g., conventional inks, inkjet inks, coatings, paints, etc.

Suitable short-chain anionic dispersants can be defined as a dispersant with chain length short enough to impact viscosity of ink formulation at moderate concentrations with acid number higher than 100 mg KOH/g based in dry polymer content. Examples of short-chain anionic dispersants include dispersants having a weight average molecular weight lower than 30,000 Mw, or more typically, lower than 15,000 Mw, or lower than 10,000 Mw, e.g., from 1,000 Mw to 30,000 Mw, or from 2,000 Mw go 15,000 Mw, and so forth.

Examples of short-chain anionic dispersants with low weight average molecular weight (Mw) acrylic and methacrylic acids homopolymers such as polyacrylic acid (PAA), polymethacrylic acid (PMAA), or their salts. More specific examples include, but are not limited to, Carbosperse® K-7028 (PAA with M~2,300), Carbosperse® K-752 (PAA with M~2,000), Carbosperse® K-7058 (PAA with M~7,300), Carbosperse® K-732 (PAA with M~6,000), Carbosperse® K-752 (Na salt of PMAA with M~5,000), all available from Lubrizol Corporation. Others include Dispex® AA 4935 available from BASF Dispersions & Pigments Division, as well as Tamol® 945 available from Dow Chemical. Low molecular weight acrylic and methacrylic acid co-polymers with other carboxylic monomer moieties can also be used, such as co-polymers of acrylic and maleic acids available from Kelien Water Purification Technology Co. Low molecular weight co-polymers of carboxylic acid monomers with other water-soluble non-carboxylic acidic monomer moieties, such as sulfonates, styrenesulfonates, phosphates, etc., can also be used. Examples of such dispersants include, but are not limited to, Carbosperse® K-775 and Carbosperse® K-776 (co-polymers of acrylic and sulfonic acid), Carbosperse® K-797, Carbosperse® K-798, or Carbosperse® K-781 (co-polymers of acrylic, sulfonic acid and styrenesulfonic acid), all available from Lubrizol Corporation. Additionally, low molecular weight co-polymers of carboxylic acid monomers with some hydrophobic monomers can likewise be used. Dispersants from this group are suitable here if their acid number (content of hydrophilic acidic moieties in polymer chain) is high enough to make the dispersant well soluble in aqueous phase. Examples of such dispersants include, but are not limited to styrene-acrylic acid copolymers such as Joncryl® 671, Joncryl® 683, Joncryl® 296, or Joncryl® 690, available from BASF, as well as other water soluble styrene-maleic anhydride co-polymer resins.

Suitable non-ionic dispersing agents can allow for suitable dispersibility and stability in an aqueous ink environment, while having little to no impact on the viscosity of the liquid phase of the ink as well as retaining good printhead reliability in thermal inkjet printheads. For definitional purposes, predominantly non-ionic dispersants are also referred to as non-ionic dispersants, provided they are non-ionic or predominantly non-ionic in nature, i.e. the acid number of the predominantly non-ionic/weak anionic dispersant, per dry polymer, is not higher than 100 mg KOH/g, and is typically not higher than 50 mg KOH/g, and most typically not higher than 30 mg KOH/g. That being stated, in one example, non-ionic dispersing agent with no anionic properties can be used.

Examples of non-ionic dispersants that are included in this definition are water-hydrolysable silane coupling agents (SCAs) with relatively short (oligomer length range of not longer than 50 units, not longer than 30 units, or not longer than 15 units, e.g., 10 to 15 units) polyether chain(s), which are also soluble in water. An example of such a dispersant includes Silquest® A1230 polyethylene glycol methoxysilane available from Momentive Performance Materials. Other examples include soluble low-to-midrange M (e.g., usually molecular mass of the polymer less than 15,000 Da) branched co-polymers of comb-type structures with polyether pendant chains and acidic anchor groups attached to the backbone, such as Disperbyk® 190 and Disperbyk® 199 available from BYK Chemie, as well as Dispersogen® PCE available from Clariant. In one example, one or both of Cab-O-Sperse® K-7028 and Disperbyk® 190 can be used.

In further detail regarding the non-ionic dispersants that can be used, in one example, reactive hydrophilic alkoxysilane dispersants that can be present, and examples include, but are not limited to, hydrolysable alkoxysilanes with alkoxy group attached to water-soluble (hydrophilic) moieties, such as water-soluble polyether oligomer chains, phosphate groups, or carboxylic groups. In some examples, the dispersant used to disperse white metal oxide pigment can be a polyether alkoxysilane or polyether phosphate dispersant. Upon dissolution in water with the white metal oxide pigment, the alkoxysilane group of the dispersant often hydrolysis resulting in formation of silanol group. The silanol group, in turn, may react or form hydrogen bonds with hydroxyl groups of metal oxide particulate surface, as well as with silanol groups of other dispersant molecules through hydrogen bonding. These reactions lead to bonding or preferential absorption of the dispersant molecules to the metal oxide particulate surfaces and also form bonds between dispersant molecules themselves. As a result, these interactions can form thick hydrophilic coatings of reactive dispersant molecules on surface of the white metal oxide pigment. This coating can increase the hydrodynamic radius of the particulates and thus reduce their effective density and settling rate. Furthermore, the dispersant coating prevents agglomeration of the white metal oxide pigment upon settling so that when sediment and settling does occur over time in the ink formulations, the settled white metal oxide pigment remain fluffy and thus are easy to re-disperse upon agitation. In still further detail, these dispersants have a relatively short chain length and do not contribute significantly to the ink viscosity, even with relatively high metal oxide particulate loads, e.g. over 25 wt % white metal oxide pigment in the ink.

As mentioned, a suitable alkoxysilane dispersant can have an alkoxysilane group which can be easily hydrolyzed in aqueous environment and produce a silanol group, and a hydrophilic segment. The general structure of the alkoxysilane group is —Si(OR)$_3$, where R most can be methyl, ethyl, n-propyl, isopropyl, or even a longer (branched or unbranched) alkane chain. It is noted that the longer the hydrocarbon (R), the slower hydrolysis rate and rate of interaction with dispersed metal oxide particulate surface. In a few highly practical examples, structures with —Si(OR)$_3$ where R is methyl or ethyl can typically be used. The hydrophilic segment of the alkoxysilane dispersant can likewise be large enough (relative to the whole molecule size) in order to enable dispersant solubility in aqueous environment, as well as prevent agglomeration of the white metal oxide pigment. In one example, the hydrophilic segment can be a polyether chain, e.g., polyethylene glycol (PEG) or its co-polymer with polypropylene glycol (PPG). Polyether-based dispersant moieties have clean thermal decomposition, and thus, are good candidates for use. When heated above decomposition temperature, PEG and PPG-based molecules decompose into smaller molecular fragments with high volatility or good water solubility. Thus, their decomposition usually does not form noticeable amounts of solid residue on surface of microscopic heaters used for driving thermal inkjet printheads (which can cause thermal inkjet printheads to fail over time or render them non-operational in some instances).

In further detail, examples polyether alkoxysilane dispersants that may be used to disperse white metal oxide pigment can be represented by the following general Formula (I):

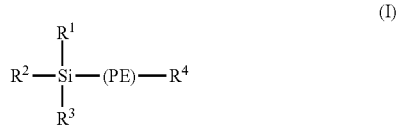

(I)

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.

b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)$—O—), or a mixture of both types. In some examples, the polyether chain segment (PE) contains PEG units (—$CH_2CH_2$—O—); and c) $R^4$ is hydrogen, or a linear or a branched alkyl group. In some examples, $R^4$ is an alkyl group having from 1 to 5 carbon atoms.

Other examples of dispersants used to disperse white metal oxide pigment can include polyether alkoxysilane dispersants having the following general Formula (II):

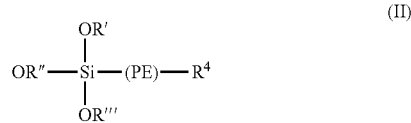

(II)

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the white metal oxide pigment present in the ink compositions are dispersed with polyether alkoxysilanes. Examples of suitable polyether alkoxysilanes include $(CH_3O)_3Si—(CH_2CH_2O)_{n'}$ H; $(CH_3CH_2O)_3Si—(CH_2CH_2O)_{n'}H$; $(CH_3O)_3Si—(CH_2CH_2O)_{n'}$, $CH_3$; $(CH_3CH_2O)_3Si—(CH_2CH_2O)_{n'}$, $CH_3$; $(CH_3O)_3Si—(CH_2CH_2O)_{n'}$, $CH_2CH_3$; $(CH_3CH_2O)_3Si—(CH_2CH_2O)_{n'}$, $CH_2CH_3$; $(CH_3O)_3Si—(CH_2CH(CH_3)O)_{n'}$, H; $(CH_3CH_2O)_3Si—(CH_2CH(CH_3)O)_{n'}$, H; $(CH_3O)_3Si—(CH_2CH(CH_3)O)_{n'}$, $CH_3$; $(CH_3CH_2O)_3Si—(CH_2CH(CH_3)O)_{n'}$, $CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, the aforementioned Silquest® A-1230 manufactured by Momentive Performance Materials, and Dynasylan® 4144 manufactured by Evonik/Degussa.

The amount of dispersant used to disperse the white metal oxide pigment and other solids may vary from about 0.1% by weight to about 300% by weight of the white metal oxide pigment content. In some examples, the dispersant content range is from about 0.5 to about 150% by weight of the white metal oxide pigment content. In some other examples, the dispersant content range is from about 5 to about 100% by weight of the white metal oxide pigment content.

A dispersion of white metal oxide pigment suitable for forming the white inks of the present disclosure can be prepared via milling metal oxide powder in water in the presence of suitable dispersants. For example, the metal oxide dispersion may be prepared by milling commercially available inorganic oxide pigment having large particulate size (in the several hundred nanometer to micron range) in the presence of the co-dispersant package described above until the desired particulate size is achieved. The starting dispersion to be milled can be an aqueous dispersion with solid content up to 70% by weight of the white metal oxide pigment or pigments. The milling equipment that can be used may be a bead mill, which is a wet grinding machine capable of using very fine beads having diameters of less than 1.0 mm (and, generally, less than 0.5 mm) as the grinding medium, for example, Ultra-Apex Bead Mills from Kotobuki Industries Co. Ltd or MiniCer® bead mill available from NETZSCH Premier Technologies, LLC. The milling duration, rotor speed, and/or temperature may be adjusted to achieve the dispersion particulate size desired. As mentioned, the co-dispersants can include a short-chain anionic dispersant and a non-ionic or predominantly non-ionic dispersant. Thus, the co-dispersants can be milled with the white metal oxide pigment, thereby modifying both particles of the white metal oxide pigment and the surface thereof with the co-dispersants.

In further detail, the white metal oxide pigment can be milled in the presence of the co-dispersants, which can generate new surfaces on the white metal oxide pigment (as the size is reduced). These new surfaces are immediately exposed to the co-dispersants, leading to enhanced absorption or adsorption of the co-dispersants to the new surfaces. This process creates a better dispersed white metal oxide pigment because of the strong attraction between the co-dispersants and the newly exposed pigment surface. In one example, preparation of the white pigment dispersion includes milling a slurry sufficiently to reduce an average particle size of the white metal oxide pigment and expose new surfaces of the white metal oxide pigment to the slurry, wherein upon new surfaces being exposed, the co-dispersants are immediately absorbed or adsorbed to the new surfaces thereof at a strength greater than prior to milling. For example, this step of milling the slurry can include milling sufficiently to reduce the average particle size to a range within 100 nm to 500 nm, e.g., from micron sized to about 150-500 nm in size, from greater than 300 nm in size reduced to less than 300 nm in size, from 325-600 nm in size reduced to 100-300 nm in size, etc. In one example, the reduction in size during milling can including reducing the white metal oxide pigment by at least 20% during milling in the presence of the co-surfactants.

It is also notable that there can be some advantages to adding the latex particulates to the white pigment dispersions to generate white inks of the present disclosure. For example, by combining white metal oxide pigment with latex particulates, opacity can be increased. In one aspect, a white metal oxide pigment to latex particulate weight ratio can be from 6:1 to 1:3. In certain specific examples, by selecting white metal oxide pigment with a high refractive index (e.g. from 1.8 to 2.8), and latex particulates with a relatively lower refractive index (e.g., from 1.3 to 1.6), the opacity of the ink when printed on a media sheet can be unexpectedly increased further compared to an ink without the added latex particulates.

Furthermore, the latex particles (at high enough concentration) can form continuous polymer phase after the ink printing and drying/curing. This polymer phase can bind rigid particles into continuous coating with good mechanical durability, i.e. act as a binder phase. In the absence of the binder in these ink formulations, the printed layer would may not have as much mechanical durability (reduced rub resistance, etc.). In one example, a latex dispersion may be produced by emulsion polymerization or co-polymerization of acrylic and styrene monomers. The list of suitable monomers can include (but is not limited to) C1 to C8 alkyl methacrylates and alkyl acrylates, styrene and substituted methyl styrenes, polyol acrylates and methacrylates such as hydroxyethyl acrylate, acrylic acid, methacrylic acid, polymerizable surfactants, or the like.

The monomers used in the latexes can also be vinyl monomers. In one example, the monomers can be one or more of vinyl monomers (such as vinyl chloride, vinylidene chloride, etc.), vinyl ester monomers, acrylate monomers, methacrylate monomers, styrene monomers, ethylene, maleate esters, fumarate esters, itaconate esters, or mixtures thereof. In one aspect, the monomers can include acrylates, methacrylates, styrenes, or mixtures thereof. The monomers can likewise include hydrophilic monomers including acid monomers as mentioned, as well as hydrophobic monomers. Furthermore, monomers that can be polymerized in forming the latexes include, without limitation (some of which being previously mentioned), styrene, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, tri methyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, combinations thereof, derivatives thereof, or mixtures thereof.

Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof.

In one specific example, the acidic monomer content in the latex mix can range from 0.1 wt % to 15 wt % and the balance being non-acidic monomers, with suitable latex particle sizes range from 50 nm to 300 nm. Glass transition temperatures may range from −20° C. to 130° C. The latex content in the white ink formulations, when present, may range from 2 wt % to 30 wt %, or from 3 wt % to 20 wt %, or more typically from 5 wt % to 15 wt %.

As mentioned, the particulate size of the white metal oxide pigment can be from 100 nm to 1,000 nm, but in other examples, the particulate size can be from 125 nm to 700 nm, or from 150 nm to 500 nm. These larger sized particulates are considered to be efficient particulate sizes for light scattering when spaced appropriately by the latex particulates and/or other spacers. The more efficient the light scattering, typically, the more opaque the printed ink layer may be (assuming appropriate spacing in the pigmented layer as described herein). Thus, the white inks of the present disclosure can be formulated such that when printed, the latex particulates or other optical spacers provide an average space between white metal oxide pigment ranging from 20 nm to 1,000 nm, in one example. In other examples, the average space between white metal oxide pigment can be 50 nm to 500 nm, from 50 to 300, or in one specific example, about 50 nm to 250 nm.

In further detail, optical spacing can be experimentally evaluated by printing the ink on a media substrate, and when a latex is present, fusing the ink by applying heat at a temperature about 2° C. to 110° C. above the minimum film formation temperature of the latex particulates, and evaluating using Transition Electron Microscopy (TEM) cross-section photo of a printed white ink layer after drying. If the opacity provided by the white ink is not high enough, the ratio of white metal oxide pigment to latex particulates and/or other optical spacers can be adjusted up or down, as effective, or the thickness of the ink can be increased. That being stated, an advantage of the white inks of the present disclosure is that in some instances, thickness does not need to be increased to increase opacity. For example, by appropriately spacing the white metal oxide pigment particulates, opacity can be boosted from 0.1% to 25%, and more typically, from 5% to 25%.

In addition to assisting with enhanced opacity, as briefly mentioned, the latex particulates can also provide enhanced durability. More specifically, the use of latex particulates, including fusible latex particulates that are thermally or otherwise cured after printing on the media substrate, can provide added durability to the printed image. Thus, the latex can provide the dual role of providing spacing for the white metal oxide pigment, and can also provide durability on the printed media sheet. This is particularly the case in examples where there may be high metal oxide particulate loads. Films formed by hard ceramic particulates such as high refractive index metal oxides on surface of low porosity and non-porous media substrates tend to have very poor mechanical properties. The film-forming behavior of latex particulates described herein can bind the relatively large white metal oxide pigment (with co-dispersants) into continuous coating that can be very durable. Additionally, as mentioned, the low refractive index of the polymer film along with the latex particulates creates low refractive index or "n" domains, i.e. optical spacers between high n white metal oxide pigment particles, thereby enhancing opacity of the print.

Coalescence of latex particulates into continuous phase creates low refractive index domains in the coating. The refractive index of the fused latex in the coating may range from 1.3 to 1.6, and in one example, can be from 1.4 to 1.6, or 1.4 to 1.5. Such a refractive index contrasted with the white metal oxide pigment particles which have a refractive index ranging from 1.8 to 2.8, or from 2.2 to 2.8. Specific examples include zinc oxide (about 2.4), titanium dioxide (about 2.5 to 2.7), zirconium oxide (about 2.4), etc. Typically, the difference in the refractive indexes can be from about 0.2 to 1.5, or more, if possible (typically, the higher is the better), though this is not always the case, as long as there is enough of a difference that the opacity can be increased at least to some degree by the optical spacing and the refractive index difference.

The latexes can have various shapes, sizes, and molecular weights. In one example, polymer in the latex particulates may have a weight average molecular weight (Mw) of about 5,000 Mw to about 500,000 Mw. In one aspect, the latex particulates can have a weight average molecular weight (Mw) ranging from about 100,000 Mw to about 500,000 Mw. In some other examples, the latex resin has a weight average molecular weight of about 150,000 Mw to 300,000 Mw.

Turning now to the fixer fluid that may be used with the white inks of the present disclosure, cationic polymer can be added to various ink or liquid vehicles to form fixer fluids of various viscosities for various application processes. Cationic polymers that may be used can include guanidinium or fully quaternized ammonium functionalities, such as quaternized polyamine copolymers. In one example, the cationic polymer might not contain primary or secondary ammonium functionalities, such as polyallylamine or polyethylene imine. Generally, for some digital application processes, i.e. thermal inkjet application, the weight average molecular weight ($_{Mw}$) of the cationic polymer allows viscosity of 1 cP to 25 cP at 25° C., 1 cP to 15 cP at 25° C., or 1 cP to 10 cP at 25° C., as measured on a Brookfield viscometer. Though viscosity outside of this range can be used, particularly for piezo inkjet applications or for analog (non-digital printing) applications, e.g., 1 cP to 35 cP at 25° C. (for piezo inkjet) and 1 cP to 500 cP at 25° C. for analog applications. Typical weight average molecular weight for the cationic polymer can be less than 500,000 $_{Mw}$, and in one aspect, less than 50,000 $_{Mw}$. In another example, cationic polymers can have high charge densities to improve fixing efficiencies. As such, cationic charge densities can be higher than 1000 microequivalents per gram cationic functionality. In one aspect, higher than 4000 microequivalents per gram can be used. Additionally, concentrations can be low to avoid regulatory issues with aquatic toxicity, e.g., from 0.1 wt % to 25 wt %, and in one aspect, 1 wt % to 5 wt %, or in another aspect, from 1 wt % to 2.5 wt %.

In additional detail, classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or more polycations may be used, and that any desirable combination of the polycations can be used. One or more ions of the cationic polyelectrolytes may be ion-exchanged for a nitrate, acetate, mesylate, or other ion. As a non-limiting example, one material is Floquat® FL2350, a quaternized polyamine derived from epichlorohydrin and dimethyl amine, commercially available from SNF Inc.

Typical liquid vehicle, e.g., vehicle for the dispersion, the ink vehicle, or the fixer vehicle formulations, described herein can include water and other ingredients, depending on the application method desired for use. For example, when jetting the ink or fixer, the formulation may include water as well as co-solvents present in total at from 0.1 wt % to 50 wt %, though amounts outside of this range can also be used. An aqueous liquid vehicle for the white metal oxide dispersion may, in some cases, include only water, though other liquid components can be added (or brought in with the other raw components) as well. In each case, surfactants can be present, and if present, can be included at from 0.01 wt % to 10 wt %. The balance of the formulation can further include or other vehicle components known in the art, such as biocides, viscosity modifiers, materials for pH adjustment, sequestering agents, preservatives, and the like. Typically, an ink vehicle can include water as one of a major solvent. It is noted that the fixer fluid may be formulated for inkjet application or for analog coating processes, and thus, the ingredients and concentrations for such different applications can vary widely. For example, a thicker slurry may be used for analog application, or a less viscous fluid may be used for digital application.

Apart from water, the liquid vehicle can, in some formulations, include high boiling solvents and/or humectants such as aliphatic alcohols, aromatic alcohols, diols, glycol ethers, polyglycol ethers, 2-pyrrolidinones, caprolactams, formamides, acetamides, and long chain alcohols. Examples of such compounds include but are not limited to 2-pyrrolidinone and 2-methyl-1,3-propanediol. The concentration range for high boiling solvents and/or humectants in the ink can be from 0.1 wt % to 30 wt %, depending on the printhead jetting architecture, though amounts outside of this range can also be used.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-

$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives known to those skilled in the art to modify properties of the ink as desired. Such additives can be present at from 0.01 wt % to 20 wt %.

It is noted that when discussing the present inks and/or methods, each of these discussions can be considered applicable to each of these embodiments, whether or not they are explicitly discussed in the context of that embodiment. Thus, for example, in discussing refractive index related to a composition or the opacity in the context of the white ink, such elements are also relevant to and directly supported in the context of the methods described herein, and vice versa.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

The term "white metal oxide pigment" refers to pigments that impart a white color to a ink, but may in fact be essentially colorless pigments with a high refractive index, e.g., greater than 1.6 or greater than 1.8. For Example, titanium dioxide ($TiO_2$) is an example of such a pigment that imparts white color to an ink, but when viewed on a particle by particle basis, can appear colorless.

The term "co-dispersants" refers to a dispersion packing including two dispersing agents. Specifically, the co-dispersants include both short-chain anionic dispersant having a weight average molecular weight ranging from 1,000 Mw to 30,000 Mw and an acid number higher than 100 mg KOH/g based on dry polymer weight, and non-ionic or predominantly non-ionic dispersant having an acid number not higher than 100 mg KOH/g based on dry polymer weight. The molecular weight (Mw) of the non-ionic or predominantly non-ionic dispersant is not defined within a narrow range, but in one example, the range can be from 500 Mw to 50,000 Mw, and in some examples, even higher. These dispersants (of both types) can be polymeric in nature, or at the lower end of the various ranges of molecular weight (Mw), can be oligomeric, e.g., both can be polymeric, both can be oligomeric, or one can be polymeric and the other oligomeric.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, it is understood that any reference to open ended transition phrases such "comprising" or "including" directly supports the use of other know, less open ended, transition phrases such as "consisting of" or "consisting essentially of" and vice versa.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the disclosed white dispersions, white inks, fluid sets, and methods that are presently known. However, it is to be understood that the following are only exemplary or illustrative of the application of the principles of the present disclosure. Numerous modifications and alternative examples may be devised by those skilled in the art without departing from the spirit and scope of the present compositions and methods. Thus, while the present formulations have been described above with particularity, the following provides further detail in connection with what are presently deemed to be the acceptable examples.

Example 1—Preparation of White Metal Oxide Pigment Dispersion

An example white metal oxide pigment dispersion was prepared by milling together, in a slurry, 50 wt % (dry pigment) white metal oxide pigment powder ($TiO_2$; about 360 nm; Ti-Pure® R706 available from DuPont), 0.5 wt % (dry polymer) short-chain anionic dispersant (low Mw polyacrylic acid dispersant; Carbosperse® K-7028 available from Lubrizol Corporation), and 0.8 wt % (dry polymer) non-ionic or predominantly non-ionic dispersant (Disperbyk®-190 available from BYK Chemie), and a balance of aqueous liquid carrier. The milling was carried out in MiniCer® bead mill available from NETZSCH Premier Technologies, LLC. utilizing YTZ milling beads with 0.3 mm diameter. Average particle size of $TiO_2$ in the dispersion was about 220 nm after milling (as determined by NANO- TRACK® particle size analyzer from Microtrack Corp.), which is about a 40% size reduction.

Example 2—Preparation of White Inks

Two white inkjet inks were prepared, including Ink 1 (Control Ink) and Ink 2. The control ink utilized a $TiO_2$ white pigment that was not dispersed in accordance with the present disclosure. More specifically, the Control ink dispersion included a base white metal oxide pigment, namely the Ti-Pure® R900 available from DuPont, and was dispersed with only a polyether alkoxysilane dispersant (Silquest A-1230 available from Momentive Performance Materials). Conversely, the white metal oxide pigment of Ink 2 was prepared and dispersed as described in Example 1. The two formulations are shown in more detail in Table 1, as follows:

TABLE 1

| Components | Ink 1 (Control Ink) | Ink 2 |
|---|---|---|
| 2-methyl-1,3-propanediol | 9 | 9 |
| 2-Pyrrolidinone | 16 | 16 |
| [1]Tergitol ® 15-S-7 | 0.9 | 0.9 |
| [2]Capstone ® FS-35 | 0.5 | 0.5 |
| [1]Tergitol ® TMN-6 | 0.9 | 0.9 |
| Acrylic latex binder (41.5 wt % polymer solids) | 21.75 | 21.75 |
| [2]Ti-Pure ® R900 $TiO_2$ dispersed with [3]Silquest A1230 (54 wt % pigment solids) | 27.8 | — |
| [2]Ti-Pure ® R706 $TiO_2$ (51.8 wt % pigment solids) dispersed with [4]Carbosperse ® K-7028 and [5]Disperbyk ®-190 (See Example 1) | — | 29 |
| Water | Balance | Balance |

[1]Available from the Dow Chemical Company;
[2]Available from DuPont;
[3]Available from Momentive Performance Materials;
[4]Lubrizol Corporation;
[5]Available from BYK Chemie.

Figure 5:
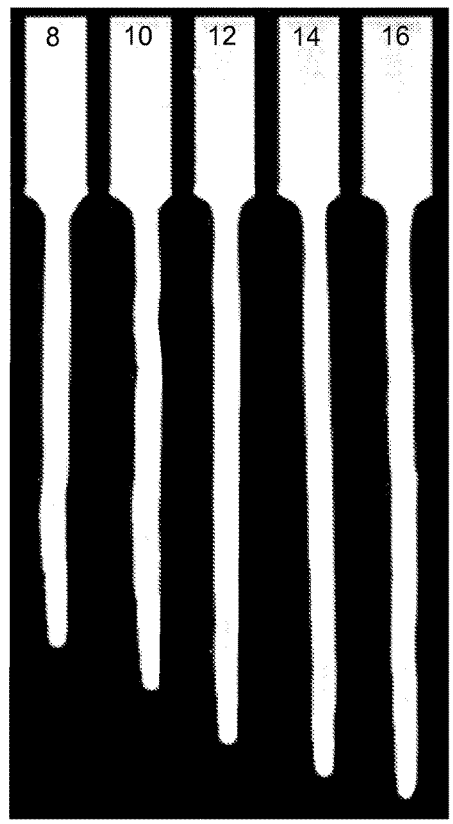
FIG. 5 is an image of a vertical drip test conducted using a Control Ink.
Figure 6:
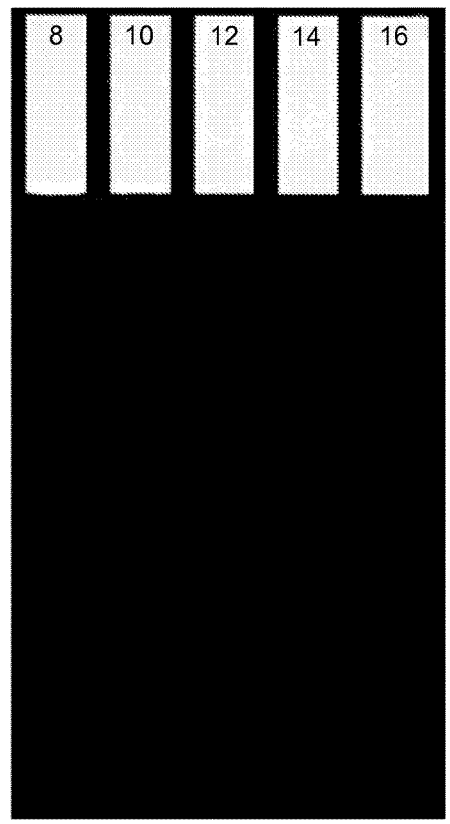
FIG. 6 is an image of a vertical drip test conducted using an ink prepared in accordance with examples of the present disclosure.

As can be seen in Table 1, the $TiO_2$ pigment content in both inks was about 15 wt % by pigment solids content. Each of these inks were printed from HP OfficeJet® 8000 printer using an HP 792 printhead, along with a cationic polymer fixer fluid (2.45 wt % of Floquat® FL2350 cationic polymer) using a separate printhead (HP 940), onto Milano black vinyl signage media. Specifically, a pattern of 5 rectangular shapes was printed with each ink at an ink coverage density of about 50 gsm (for the white inks), while the fixer fluid coverage density was varied from 8 wt % to 16 wt % based on the white coverage density. After printing, the media samples were positioned vertically for 5 minutes to let the "loose" (non-fixed) pigment flow down the print surface. After five minutes, the prints were manually dried and cured using a heat gun at a temperature of about 100° C. to 120° C. Ink 1 (Control Ink) had very poor fixing fluid reactivity and dripped down the media surface (see FIG. 5). Ink 2, based on the white metal oxide pigment dispersed according to Example 1, stayed at the originally printed location because it was "gelled" on the spot through interaction with the cationic fixing fluid.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A white pigment dispersion, comprising:
   an aqueous liquid vehicle; and
   from 5 wt % to 70 wt % of a white metal oxide pigment dispersed by two co-dispersants, wherein the metal oxide pigment has an average particulate size from 100 nm to 1 µm, and wherein the co-dispersants include both i) a short-chain anionic dispersant having a weight average molecular weight ranging from 1,000 Mw to 30,000 Mw, and ii) a non-ionic or predominantly non-ionic dispersant.

2. The white pigment dispersion of claim 1, formulated as a white ink, wherein the white metal oxide pigment is present in the ink at from 5 wt % to 50 wt %, and wherein the white ink further comprises from 2 wt % to 30 wt % latex particulates having a glass transition temperature from −20° C. to 130° C.

3. The white pigment dispersion of claim 2, wherein white metal oxide pigment and latex particulates are present in the white ink at a weight ratio from 6:1 to 1:3.

4. The white pigment dispersion of claim 1, wherein the white metal oxide pigment includes titanium dioxide particulates, zinc oxide particulates, zirconium oxide particulates, or combinations thereof.

5. The white pigment dispersion of claim 1, wherein the short-chain anionic dispersant is present in the white pigment dispersion at from 0.005 wt % to 2 wt %, has an acid number higher than 100 mg KOH/g based on dry polymer weight, and has a weight average molecular weight of 2,000 Mw to 15,000 Mw.

6. The white pigment dispersion of claim 1, wherein the non-ionic or predominantly non-ionic dispersant is present in the white pigment dispersion at from 0.01 wt % to 4 wt %, has an acid number not higher than 100 mg KOH/g based on dry polymer weight, and has a weight average molecular weight from 500 Mw to 50,000 Mw.

7. The white pigment dispersion of claim 1, wherein the white metal oxide pigment milled in the presence of the co-dispersants to generate new surfaces of the white metal oxide pigment which are immediately exposed to both co-dispersants for enhanced absorption or adsorption of the co-dispersants to the new surfaces.

8. A method of making a white pigment dispersion, comprising milling a slurry including from 5 wt % to 70 wt % of a white metal oxide pigment in an aqueous liquid vehicle with co-dispersants, the co-dispersants including both i) a short-chain anionic dispersant having a weight average molecular weight ranging from 1,000 Mw to 30,000 Mw, and ii) a non-ionic or predominantly non-ionic dispersant.

9. The method of claim 8, further comprising formulating the white pigment dispersion into a white ink comprising steps of admixing water, organic co-solvent, and latex particulates with white metal oxide pigment dispersion.

10. The method of claim 9, wherein the white ink comprises:
    from 5 wt % to 50 wt % of the white metal oxide pigment having an average particulate size from 100 nm to 1,000 nm; and
    from 2 wt % to 30 wt % of the latex particulates having a glass transition temperature from 0° C. to 130° C.

11. The method of claim 8, wherein the step of milling the slurry includes milling sufficiently to reduce an average particle size of the white metal oxide pigment and expose new surfaces of the white metal oxide pigment to the slurry, wherein upon new surfaces being exposed, the co-dispersants are both immediately absorbed or adsorbed to the new surfaces thereof at a strength greater than prior to milling.

12. The method of claim 8, wherein the step of milling the slurry includes milling sufficiently to reduce the average particle size of the white metal oxide pigment to a range within 100 nm to 500 nm.

13. A fluid set for inkjet imaging, comprising:
  a white ink, comprising:
    an aqueous ink vehicle,
    from 5 wt % to 50 wt % of a white metal oxide pigment having an average particulate size from 100 nm to 1,000 nm, and being milled in the presence of co-dispersants including both i) a short-chain anionic dispersant having a weight average molecular weight ranging from 1,000 Mw to 30,000 Mw, and ii) a non-ionic or predominantly non-ionic dispersant, and
    from 2 wt % to 30 w % latex particulates; and
  a fixer fluid, comprising:
    aqueous fixer vehicle, and
    from 0.1 wt % to 25 wt % cationic polymer.

14. The fluid set of claim 13, wherein the white ink is formulated for inkjet application, and wherein the fixer fluid is formulated for inkjet application having a viscosity from 1 cP to 35 cP at 25° C.

15. The fluid set of claim 13 wherein the white ink is formulated for inkjet application, and wherein the fixer fluid is formulated for analog application having a viscosity from 1 cP to 500 cP at 25° C.

* * * * *

UNITED STATES PATENT AND TRADEMARK OFFICE
CERTIFICATE OF CORRECTION

PATENT NO. : 10,167,406 B2
APPLICATION NO. : 15/544578
DATED : January 1, 2019
INVENTOR(S) : Paul Joseph Bruinsma et al.

Page 1 of 1

It is certified that error appears in the above-identified patent and that said Letters Patent is hereby corrected as shown below:

In the Claims

In Column 17, Line 18, Claim 13, delete "w %" and insert -- wt % --, therefor.

Signed and Sealed this
Twenty-first Day of May, 2019

Andrei Iancu
*Director of the United States Patent and Trademark Office*